(12) United States Patent
Liebowitz et al.

(10) Patent No.: US 10,137,814 B2
(45) Date of Patent: *Nov. 27, 2018

(54) VEHICLE TRAY

(71) Applicant: Level Solutions, LLC, New York, NY (US)

(72) Inventors: Tyler Liebowitz, New York, NY (US); James Harry Delaney, New York, NY (US)

(73) Assignee: LEVEL SOLUTIONS, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/268,603

(22) Filed: Sep. 18, 2016

(65) Prior Publication Data

US 2018/0009356 A1    Jan. 11, 2018

(30) Foreign Application Priority Data

Jul. 8, 2016   (CA) ..................................... 2935549

(51) Int. Cl.
*B60N 3/00*   (2006.01)
*B60N 3/10*   (2006.01)

(52) U.S. Cl.
CPC ............. *B60N 3/002* (2013.01); *B60N 3/103* (2013.01)

(58) Field of Classification Search
CPC ............. B60R 7/043; B60R 2011/0075; B60R 2011/0012; B60R 2011/0059; B60N 2002/4405; B60N 3/002; B60N 3/001; B60N 3/013; B60N 3/103

USPC ........................................................ 224/275
See application file for complete search history.

(56) References Cited

U.S. PATENT DOCUMENTS

| | | | |
|---|---|---|---|
| D253,561 S | 12/1979 | Vigue | |
| 5,542,589 A * | 8/1996 | McKee | B60N 3/001 224/275 |
| 5,833,056 A | 11/1998 | Goldman | |
| D436,853 S | 1/2001 | Sussman | |
| D438,100 S | 2/2001 | Cekota | |
| 6,401,927 B1 * | 6/2002 | Sorensen | A47G 19/06 206/216 |
| 6,626,338 B1 | 9/2003 | Rhodes, Jr. | |
| 6,932,214 B1 | 8/2005 | Zimet | |
| 7,225,927 B2 | 6/2007 | Sweeney | |
| 8,382,053 B2 | 2/2013 | Webb | |
| 9,434,287 B2 * | 9/2016 | Liebowitz | B60N 3/103 |
| 2008/0011926 A1 | 1/2008 | Cappellino | |
| 2011/0278187 A1 * | 11/2011 | Yang | B65D 71/70 206/427 |
| 2015/0197175 A1 | 7/2015 | Liebowitz et al. | |

FOREIGN PATENT DOCUMENTS

WO   2005/087607 A1   9/2005
WO   2007/068095 A1   6/2007

* cited by examiner

*Primary Examiner* — Adam Waggenspack
(74) *Attorney, Agent, or Firm* — Loza & Loza, LLP; Michael F. Fedrick

(57) ABSTRACT

A vehicle tray for retaining food and/or drink items which includes a center slot for receiving a seat buckle in order to stably retain the tray during vehicular movement.

12 Claims, 17 Drawing Sheets

US 10,137,814 B2

VEHICLE TRAY

BACKGROUND

Most transportation vehicle seats are not horizontally level, and when a normal four or six cup drink tray is placed on them during transportation, the drink cups in the tray are therefore disposed at an angle with respect to the vehicle floor and/or a road surface. In this position the upper surfaces of the liquids in the drink cups may reach or exceed the upper rim of the cups, either while the cups are stationary or as a result of bumps or other motion experienced while a vehicle is moving. Because of this, the liquids have a tendency to spill when the vehicle accelerates, stops, or turns. Drinks held in trays may also spill due to the movement of the vehicle.

Drink trays used in today's market do not have the capability to adjust for the slope of a vehicle seat, or keep trays in a stationary position while being transported. Current drink trays placed on a vehicle seat for transportation are instead automatically positioned at the incline of the seat.

FIGURES

SUMMARY

Figure 1:
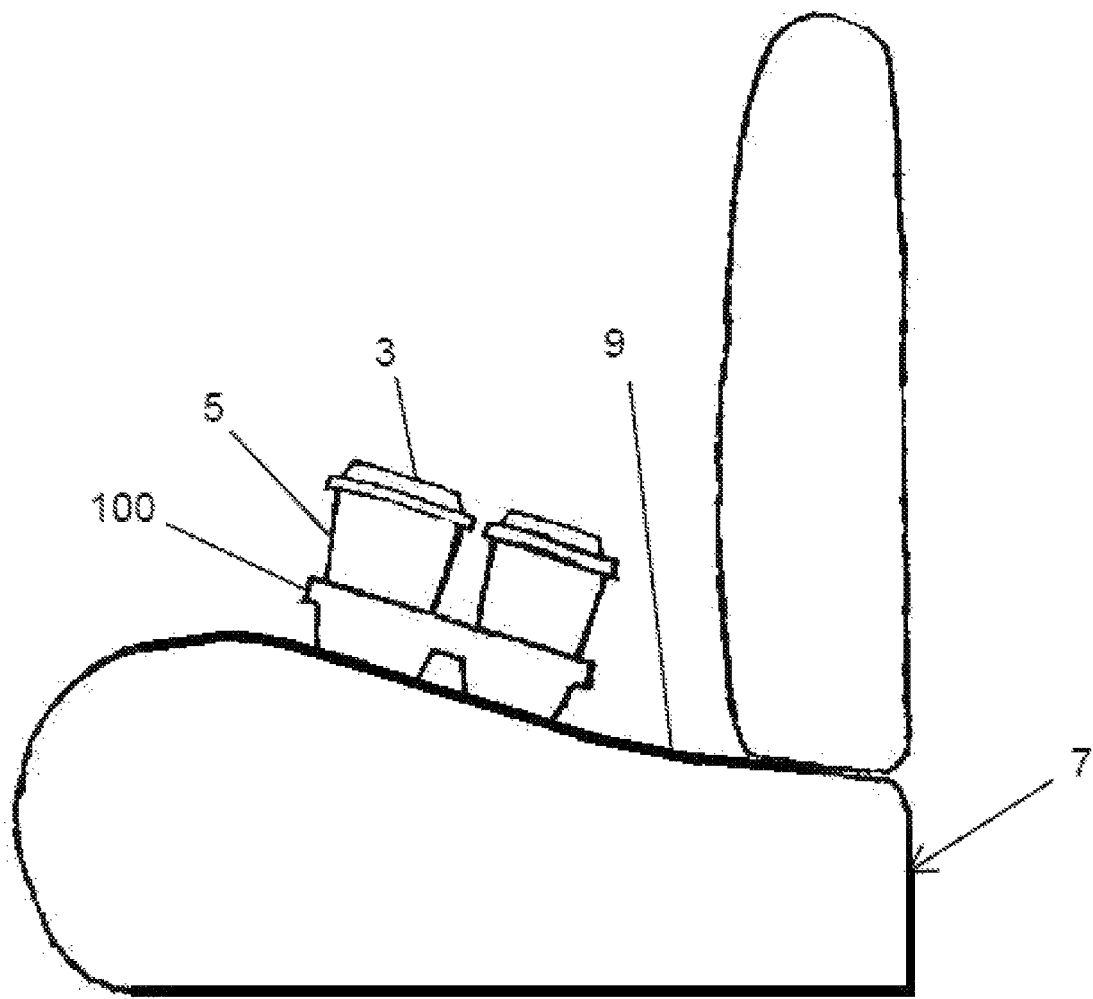
FIG. 1 is a side view of a conventional drink tray containing drinks, placed on a vehicle seat.
Figure 2:
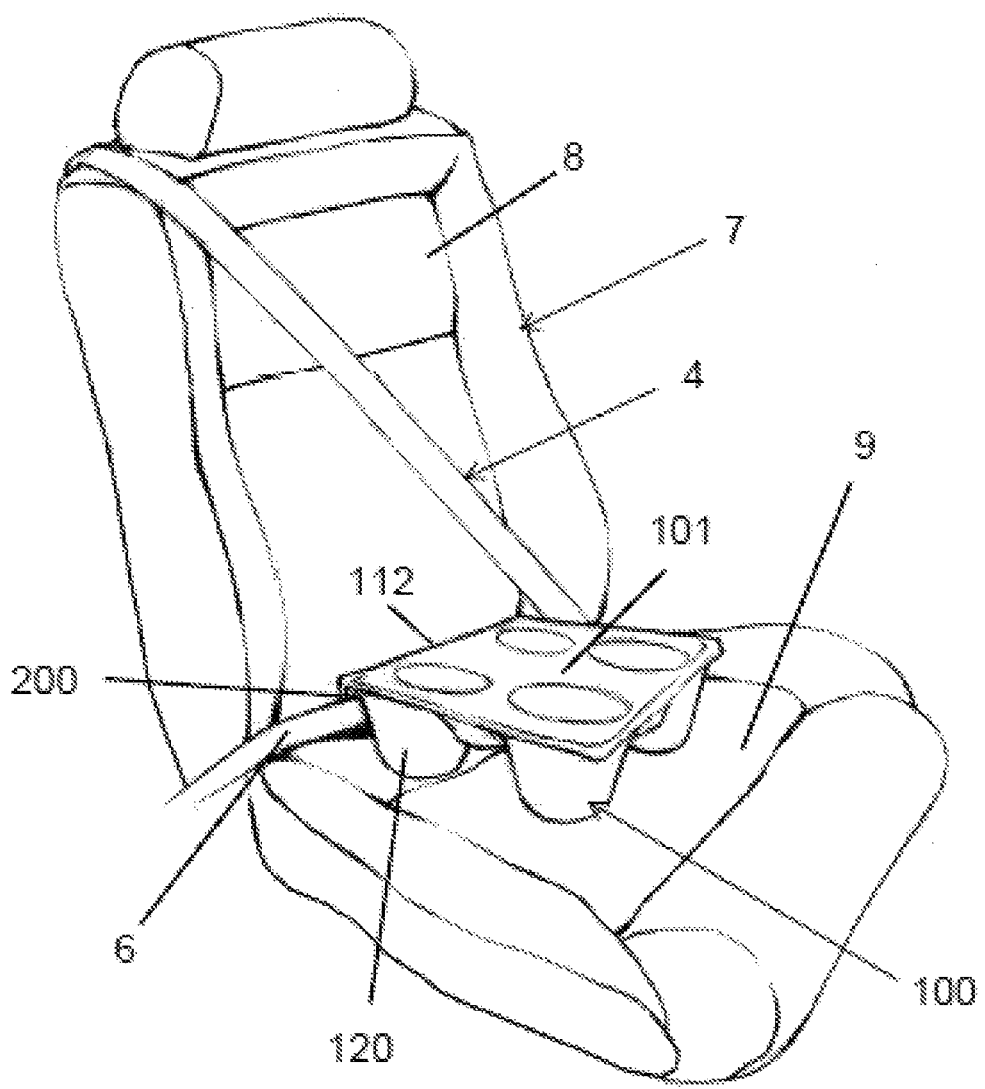
FIG. 2 is a perspective view of an embodiment of the present drink tray buckled into a car seat.
Figure 3:
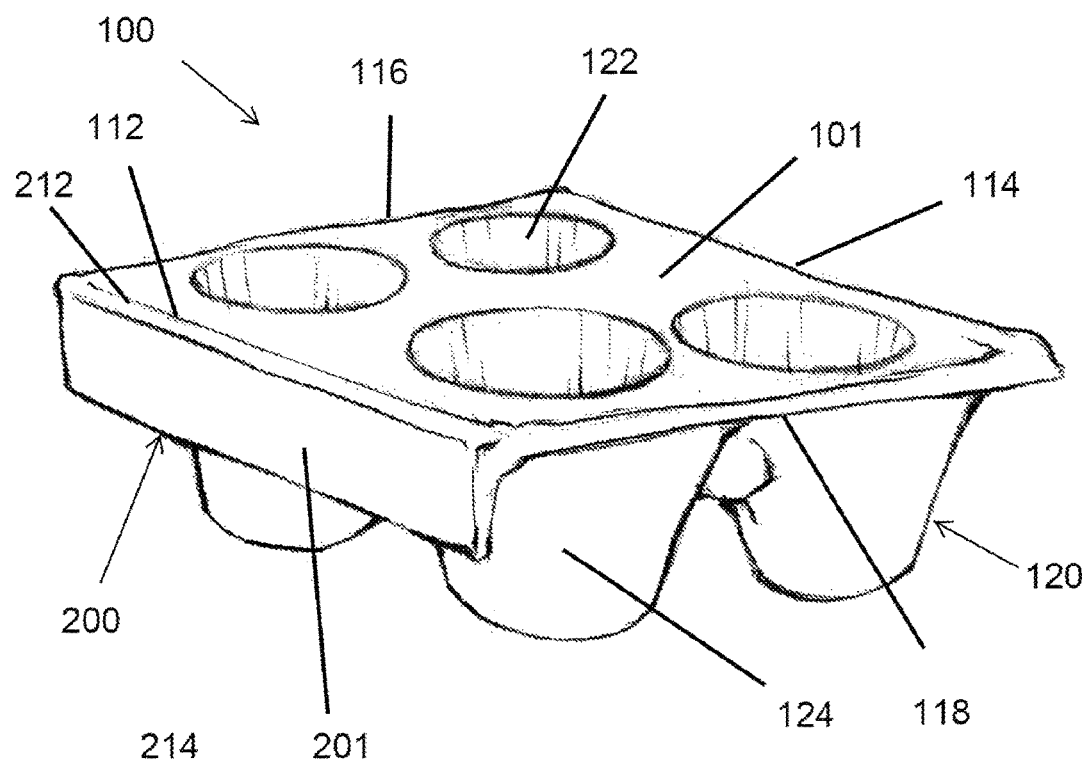
FIG. 3 is a right side perspective view of the drink tray of FIG. 1.
Figure 4:
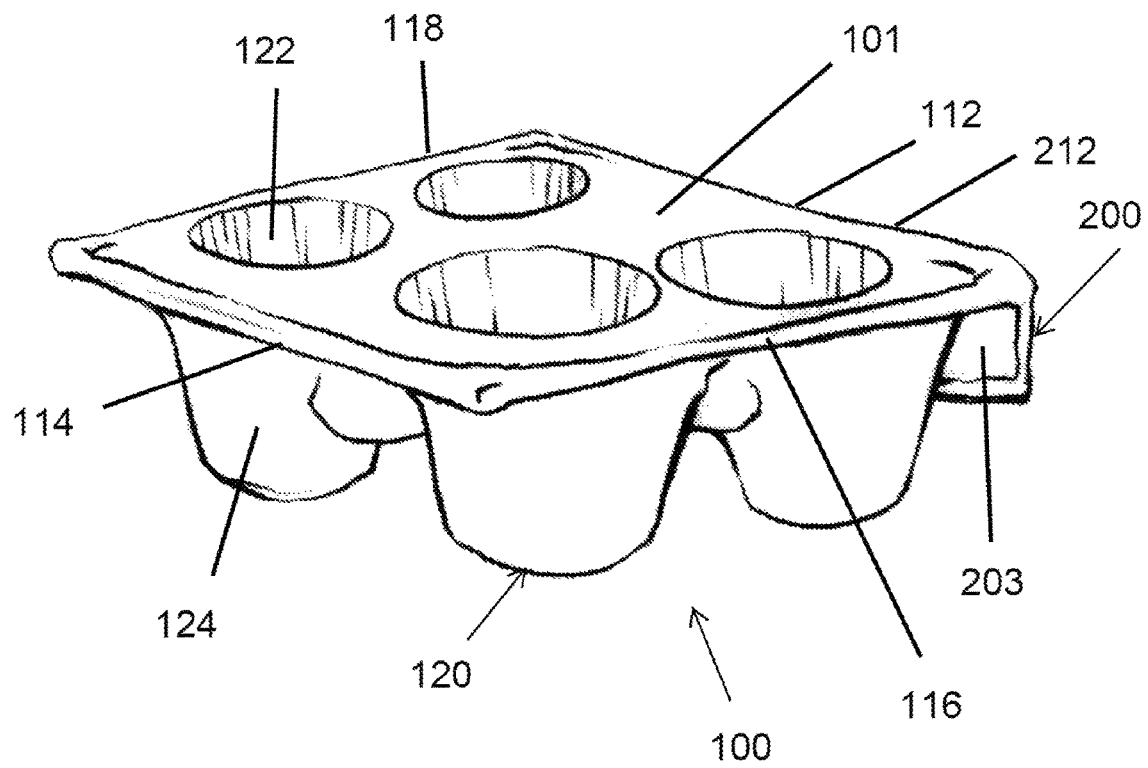
FIG. 4 is a left side perspective view of the drink tray of FIG. 1.
Figure 5:
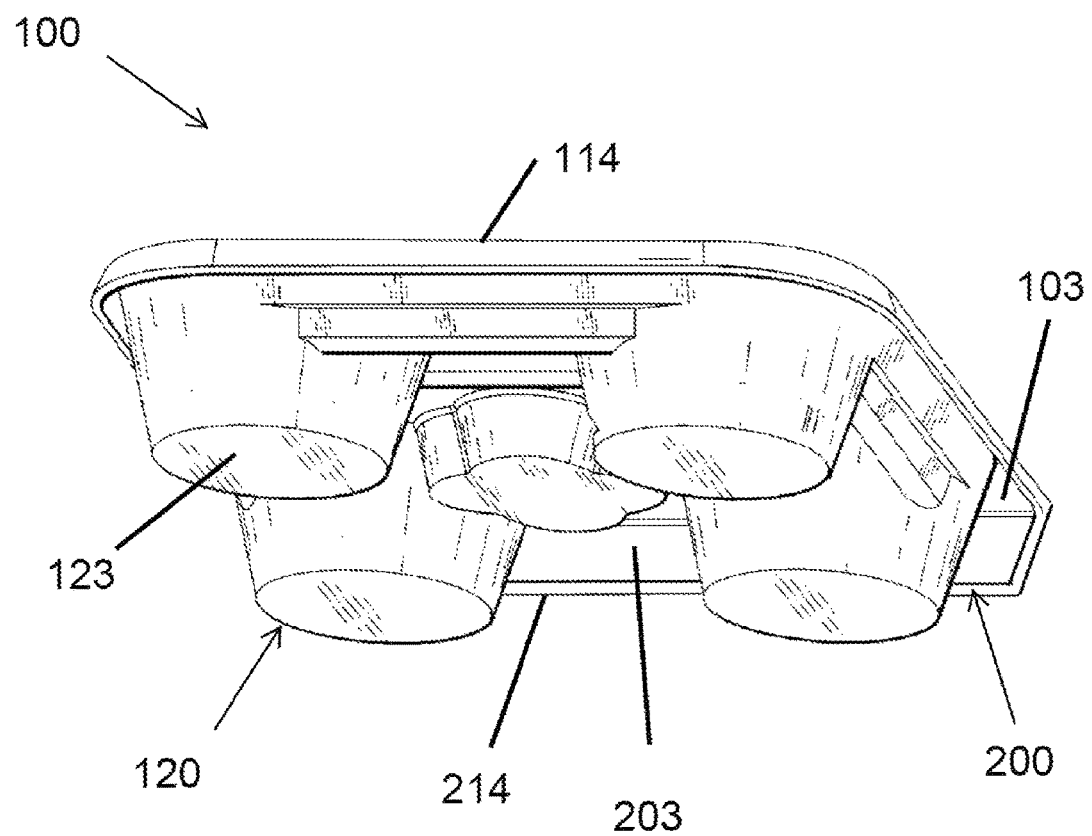
FIG. 5 is a bottom perspective view of the drink tray of FIG. 1.
Figure 6:
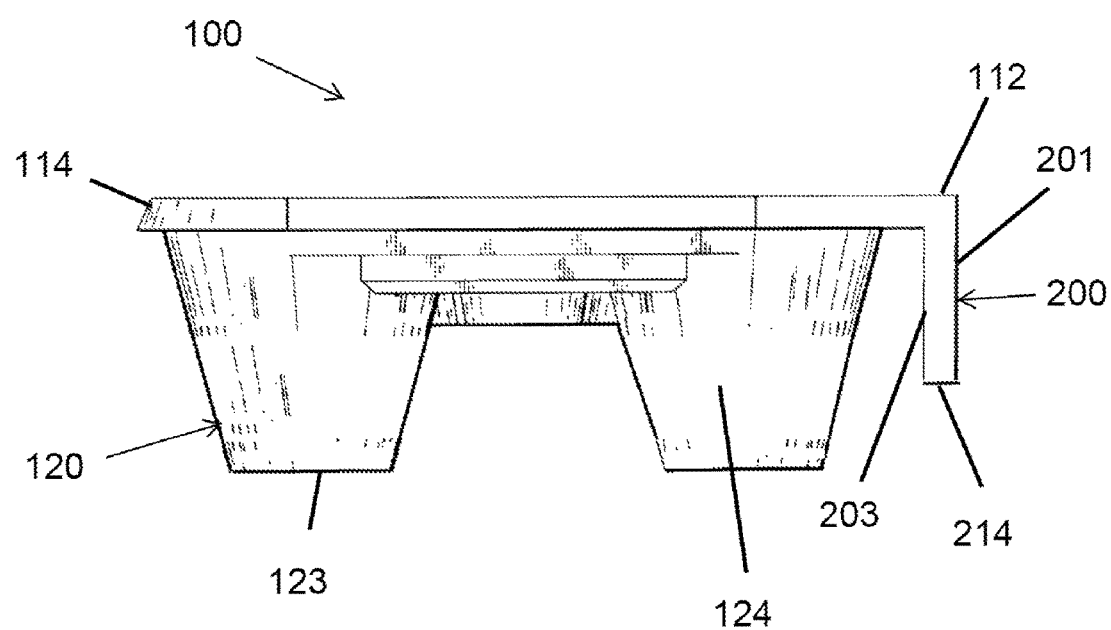
FIG. 6 is a side elevation view of the drink tray of FIG. 1.

Distracted driving has become a major issue in our society. With the present invention, a driver no longer has to use one of his hands to stabilize a drink tray while driving. The present "hands-free" designs keeps drinks secure while a driver keeps both hands on the wheel of a vehicle and concentrates on the road.

DESCRIPTION

Definitions

As used herein, the following terms and variations thereof have the meanings given below, unless a different meaning is clearly intended by the context in which such term is used.

"Concave" refers to an item or component having a surface or boundary that curves or bulges inward.

"Convex" refers to an item or component having a surface or boundary that curves or bulges outward.

"Downward" and "downwardly" mean in the direction of or toward a support surface on which the present drink tray is or can be positioned.

"Drink tray" refers to a container for retaining cups, such as coffee or soda cups, and/or for retaining other containers for liquids. Drink trays may also retain containers for food items. Drink trays include one or more receptacles shaped to retain the lower portion of a cup or other container, preferably by frictional engagement between the inner surface of a receptacle of the tray and a respective cup. Drink trays typically have at least two receptacles, more commonly four or six receptacles.

"Hook" refers to a curved or angular extension for catching, pulling, or holding something.

"Horizontal" refers to an orientation approximately parallel to (i.e., not substantially extending toward or away from) a support surface, in particular the floor of a vehicle and/or a surface on which the vehicle is supported, such as a road.

"Inner," "inward" and "inwardly" mean in a direction or position located toward the horizontal or vertical center of the present drink tray or of a component part of the drink tray.

"Lower" refers to the relative position of a component in the present drink tray which is closer to or toward a support surface on which the present drink tray is or can be positioned.

"Pulp" refers to a cellulosic fibrous material prepared by separating cellulose fibers from wood, fiber crops or waste paper.

"Rectangle" and "rectangular" refer to a quadrilateral parallelogram in which both pairs of opposite sides are parallel to each other, whose sides preferably meet to form four right angles. A square is a rectangle having all four sides of equal length.

"Rim" refers to the upper or outer edge of an object.

"Tray" refers to a container, usually open at the top, for retaining drink items or food items.

"Upper," "upward," and "upwardly" refer to the relative position of a component in the present drink tray which is further from or away from a support surface on which the present drink tray is or can be positioned.

"Vertical" refers to an orientation extending toward or away from a support surface, in particular the floor of a vehicle and/or a surface on which the vehicle is supported, such as a road.

The term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise.

Hook Trays

FIG. 1 illustrates the problem to be solved by the present drink trays. When a drink tray 100 carrying drink cups 5 filled with liquid is placed on the upper surface 9 of a vehicle seat 7, the drink cups 5 are effectively tilted toward the rear of the seat 7. Depending on the degree of tilt of the upper surface 9 of the seat 7 and on how full of liquid the cups 5 are, the upper surface of the liquid in each cup will approach or flow beyond the upper rim of the cup 5, thereby either spilling the liquid or making it more likely that the liquid will splash out of a drink opening in the lid 3 attached to the cup once the vehicle is in motion.

FIGS. 2-7 illustrate one solution to this problem. The illustrated tray (a drink tray) 100 includes a projection 200 that extends downwardly from one end of the upper side 101 of the drink tray 100 to form a hook. As shown in FIG. 1, the lower or lap portion 6 of a seat belt 8, i.e. the portion which extends from one lateral side of the seat 7 to the other lateral side, passes between the projection 200 and receptacles 120 extending downwardly from the underside of the tray 100. The projection 200 is thereby interposed or sandwiched between the back surface 8 of the seat 7 and the lap portion 6 of the seat belt 8. In this way, the horizontal motion (forward and backward) of the tray 100 is limited, with forward motion being restricted by contact between the inner surface 203 of the projection 200 and the lap portion 6 of the seat belt 8, and backward motion being limited by contact between the outer surface 201 of the projection 200 and the back surface 8 of the seat 7. In addition, when the lap belt 6 is disposed so as to hold the drink tray 100 under tension, the lap belt 6 pulls the proximal side 112 of the drink tray 100 toward the back surface 8 of the seat 7 and also thereby supports the proximal side 112 above the upper surface 9 of the seat. The upper edge of the lap belt 6 may also assist in holding the proximal side 112 above the upper surface 9 by contacting the lower surface 103 of the drink tray 100.

FIGS. 3-6 illustrate a four-receptacle drink tray of the present invention, though it is to be understood that other numbers of receptacles, in particular even numbers like 2 and 6, can also be used. Such drink trays 100 conventionally comprise an upper surface 101, a lower surface 103, and two or more receptacles 120. The receptacles comprise an interior surface 122 configured to receive and preferably retain a cup with a friction fit, and an exterior surface 124. The exterior surface 124 is typically convex in shape, and when the tray is formed from a single layer of material the exterior surface 124 of the receptacle 120 forms a part of the lower surface 103 of the tray 100. The present trays are preferably rectangular in shape, with a proximal side, a distal side 114, a left lateral side 116, and right lateral side 118.

As shown in the illustrated embodiment, the upper surface 101 of the tray 100 extends horizontally away from the perimeters of the receptacles on the proximal side 112, and at the periphery of the proximal side 112 a projection 200 extends downwardly. The projection 200 can take a number of forms, but in the illustrated embodiment is a panel having a proximal end 212 adjacent to or coextensive with the proximal end 112 of the tray 100 and a distal end 214, with the distal end in this embodiment comprising a horizontal boundary parallel to the proximal side 112 of the tray. Preferably, the projection extends at right (90°) angle with respect to the upper surface 101 of the tray 100, although other angles are also possible. In some embodiments a plurality of downward projections can extend from the proximal side 112 of the drink tray 100. In one embodiment, the projection 200 extends downwardly approximately half the distance between upper surface 101 of the drink tray 100 and the convex lower surface 123 of each of the receptacles 120. In other embodiments, the projection can extend about a third of this distance, or can extend as far as a horizontal plane passing through the lower surface 123 of one or more of the receptacles 120, though intermediate or shorter distances are also possible.

The present drink tray 100 is particularly adapted to be used with cellulosic press-formed or molded pulp trays, though other materials can also be used to form the present tray 100.

Figure 7:
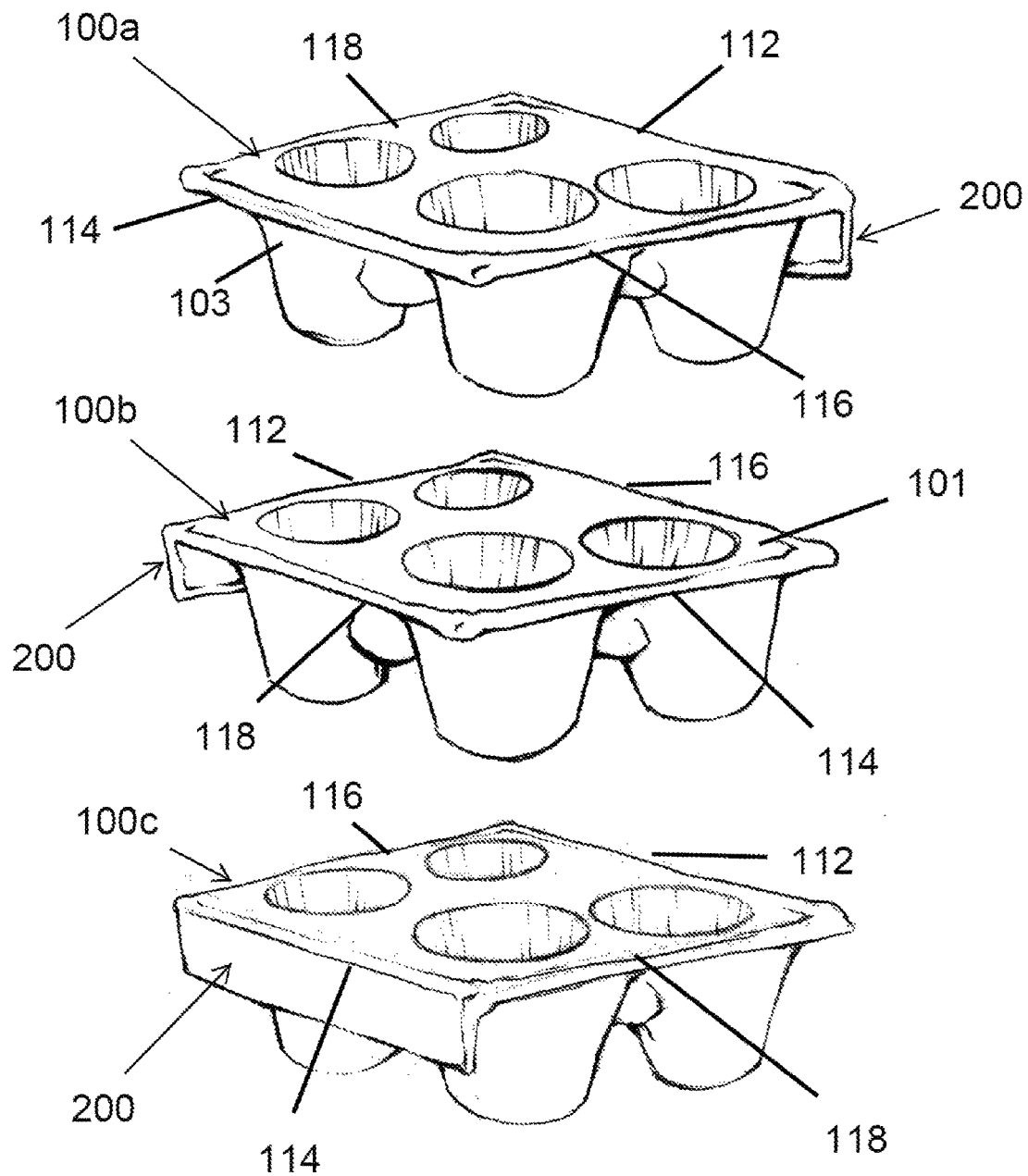
FIG. 7 is an exploded perspective view showing the stacking of drink trays according to the embodiment of FIG. 1.
Figure 8:
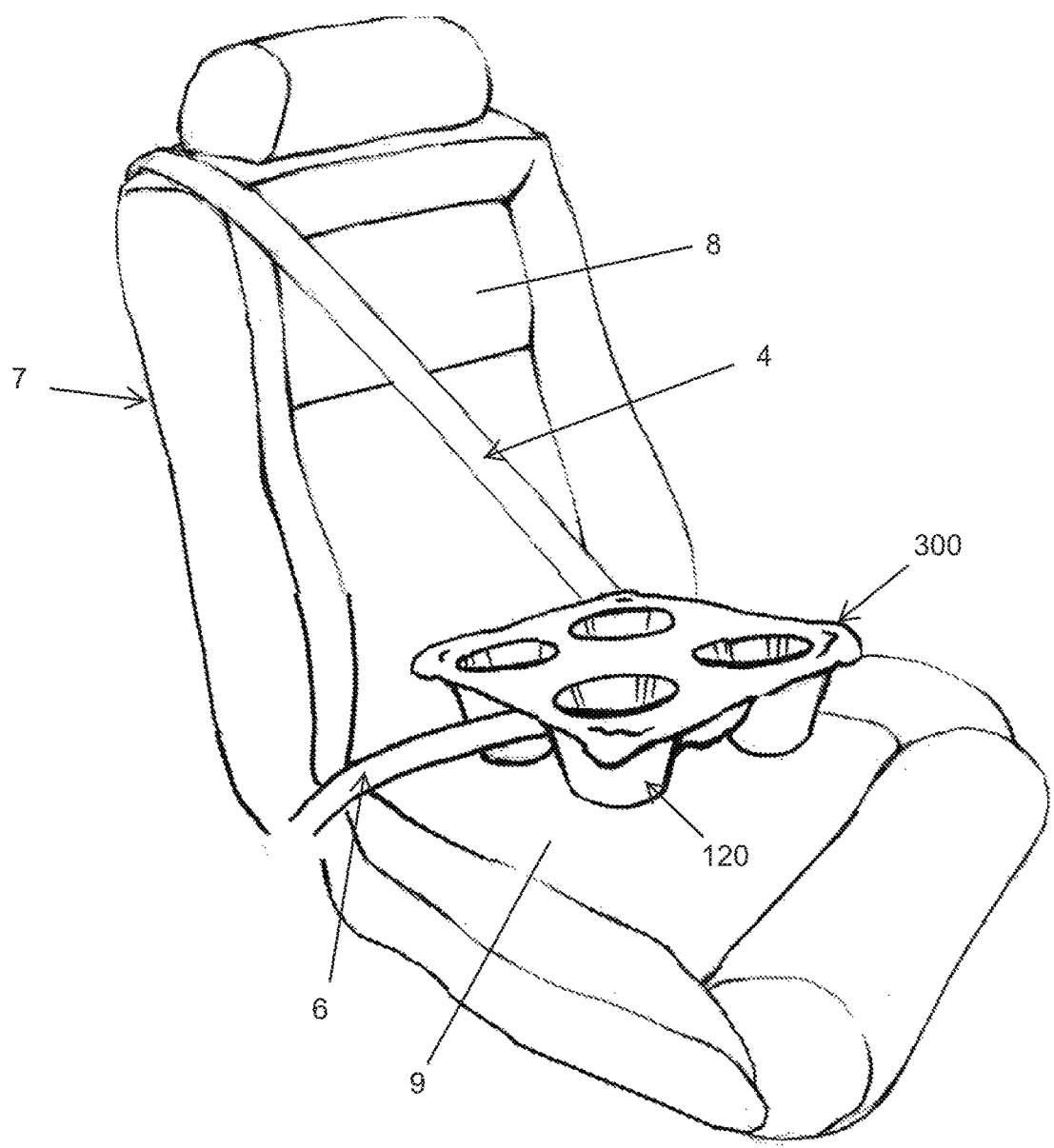
FIG. 8 is a perspective view of another embodiment of the present drink tray buckled into a car seat.

FIG. 7 illustrates a preferred method of stacking the present drink trays 100. When approximately square drink trays 100 are used, a first drink tray 100*a* can be stacked within a second drink tray 100*b* by orienting the proximal end 112 of tray 100*a* so that it is aligned with left lateral side 116, after which tray 100*a* is urged downwardly so that the lower end of the receptacles 120 fit within the interiors of corresponding receptacles of the tray 100*a*, i.e. such that the lower surface 103 of tray 100*a* is placed into contact with the upper surface 101 of tray 100*b*. In this way, the downward projection 200 of tray 100*a* does not contact or interfere with the projection 200 of tray 100*b*. Preferably, the projection 200 of tray 100*a* is disposed at a right angle with respect to the projection of tray 100*b*. Tray 100*b* is likewise stacked on top of tray 100*c* such that the projection 200 of tray 100*b* is at a right angle to that of tray 100*c*. When trays 100 are stacked so that subsequently stacked trays are oriented at right angles, the trays 100 can be stacked without resulting in interference between the projections 200 of each tray. Preferably, the vertical extent of the projection 200 is equal to or less than four times the thickness of the material forming the trays, in particular when such material is a molded or press-formed material such as cardboard.

Center Slot Trays

In an alternative embodiment, shown in FIGS. 8-17, slotted trays 300 can be retained in a vehicle seat 7 using a center slot 310 provided in a middle portion of the tray 300, preferably in the center of the tray. The slot 310 comprises a vertically extending space between opposing lateral side of the tray, extending upwardly from a lower portion of the tray 300 to an upper terminus. The slot 310 is sized to retain a seat belt within it.

FIGS. 9-16 illustrate a slotted, four-receptacle drink tray according to this embodiment, though it is to be understood that other numbers of receptacles, in particular even numbers like 2 and 6, can also be used. Such drink trays 300 conventionally comprise a tray portion 305 having an upper surface 301, a lower surface 303, and two or more receptacles 320 located in respective openings 303 of the tray portion 305, similar to the embodiments described above. The receptacles 320, generally configured to retain a container such as a drink cup, each comprise an interior surface 322, an exterior surface 324, an upper end 321, a lower end 323, one or more walls 325, and a floor 327 formed in a lower end of the receptacle 320. The walls 325 extend downwardly from the upper surface 301 of the tray portion 305, and the rim 326 of each receptacle at the upper end 321 is preferably contiguous with the upper surface 301 of the tray portion 305. In the illustrated embodiments, the receptacle walls include openings 329, generally to reduce the weight and material requirements of the tray, but such openings are optional. The interior surface 322 configured to receive and preferably retain a cup with a friction fit, and an exterior surface 324. The exterior surfaces 324 of the receptacles 320 are typically convex in shape, with the interior surface 322 being correspondingly concave. Preferably, the interior surfaces 322 of the walls 325 of the receptacles are cylindrical or frusto-conical in shape, in order to better retain correspondingly shaped drink containers, but other configurations are possible. The receptacles 320 can be integrally formed with the tray portion of the tray 300, for example when the tray is formed from a single layer of material.

Figure 9:
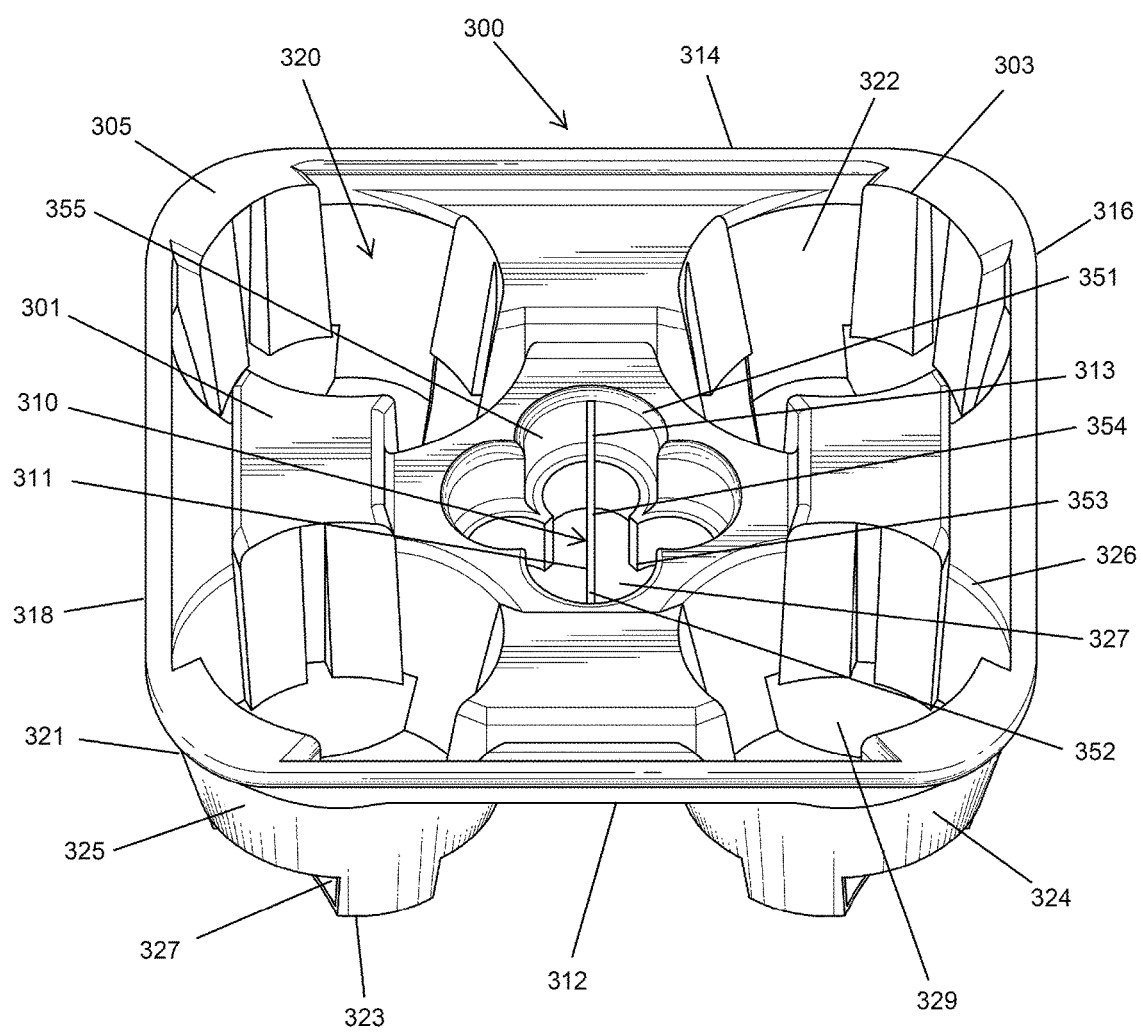
FIG. 9 is a top perspective view of the drink tray of FIG. 8.
Figure 10:
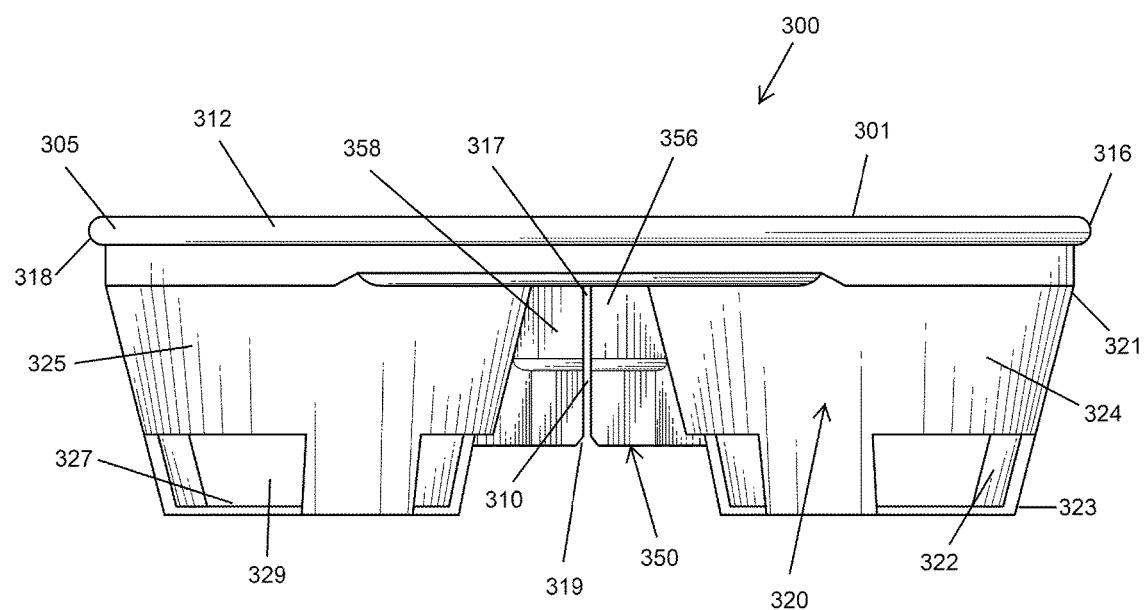
FIG. 10 is a front elevation view of the drink tray of FIG. 8.
Figure 11:
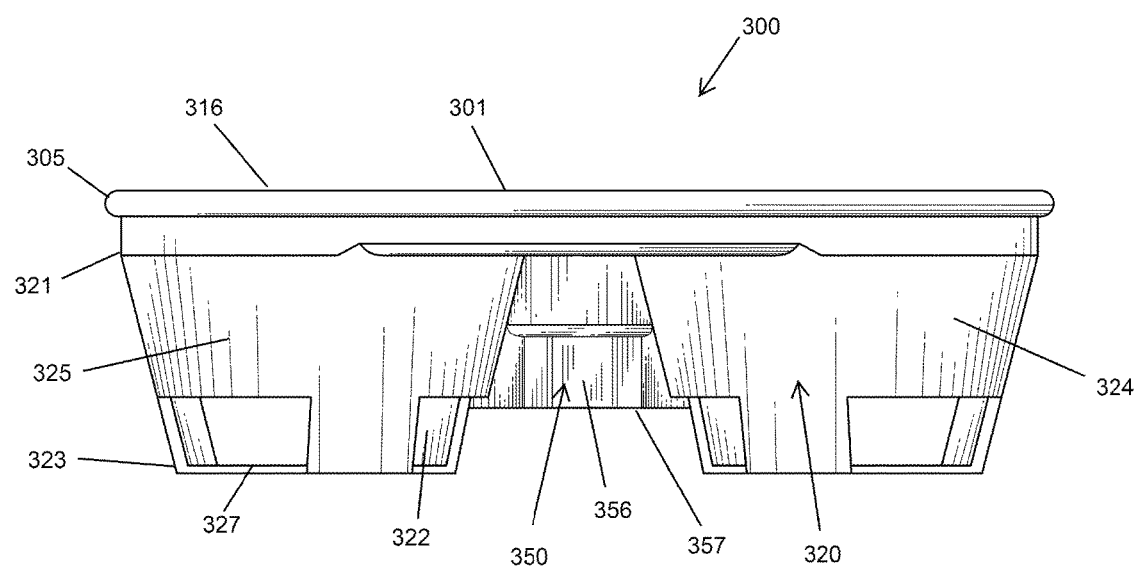
FIG. 11 is a right side elevation view of the drink tray of FIG. 8.
Figure 12:
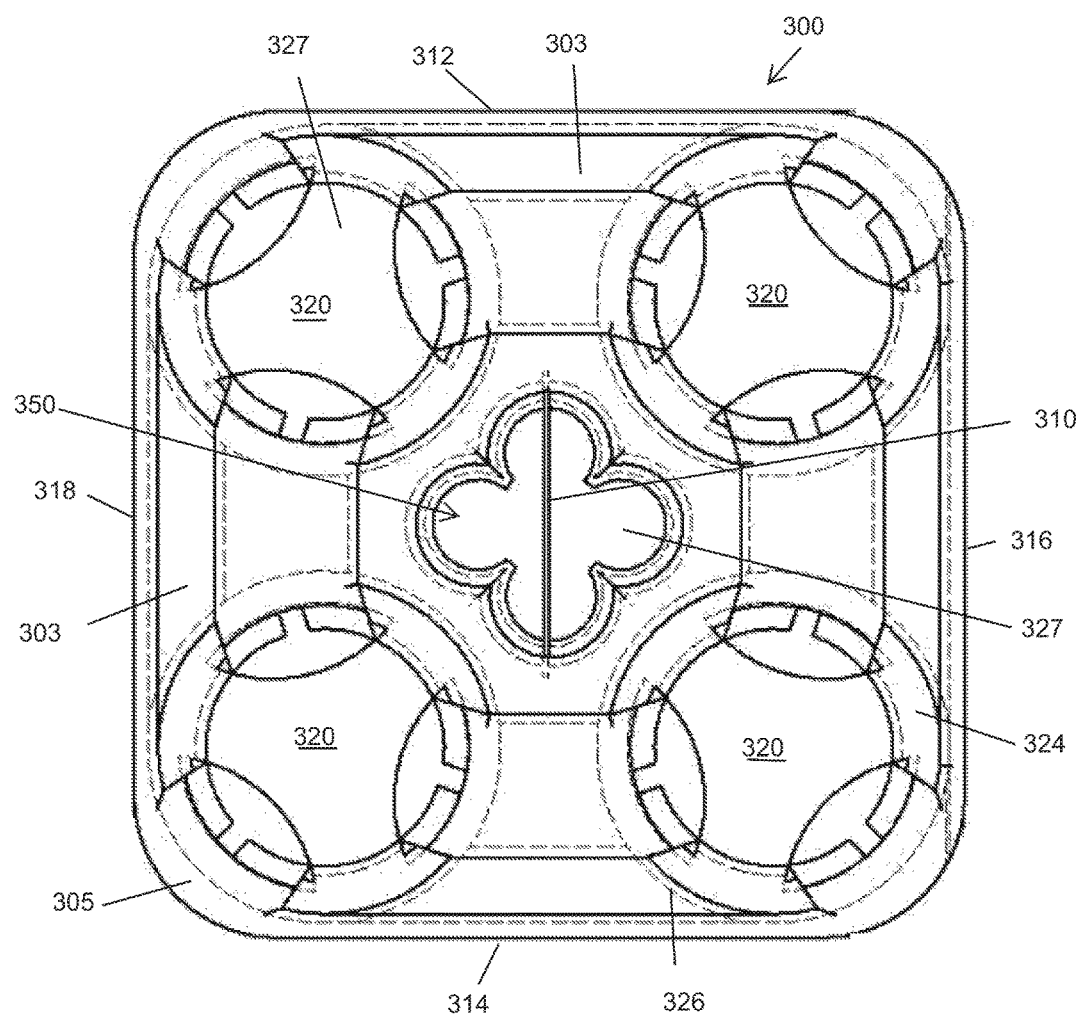
FIG. 12 is a bottom plan view of the drink tray of FIG. 8.
Figure 13:
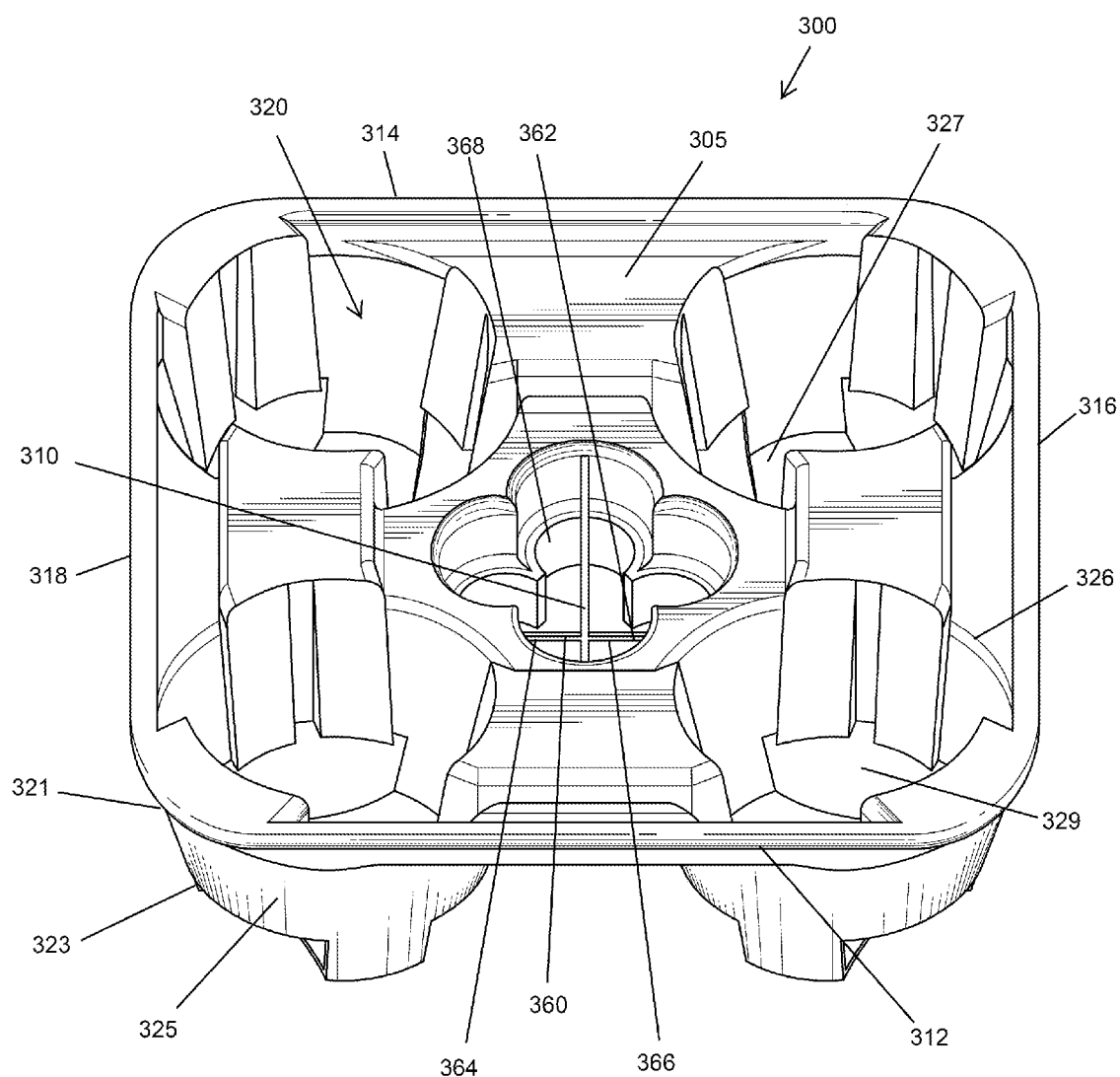
FIG. 13 is a top perspective view of a further embodiment of the present drink tray.
Figure 14:
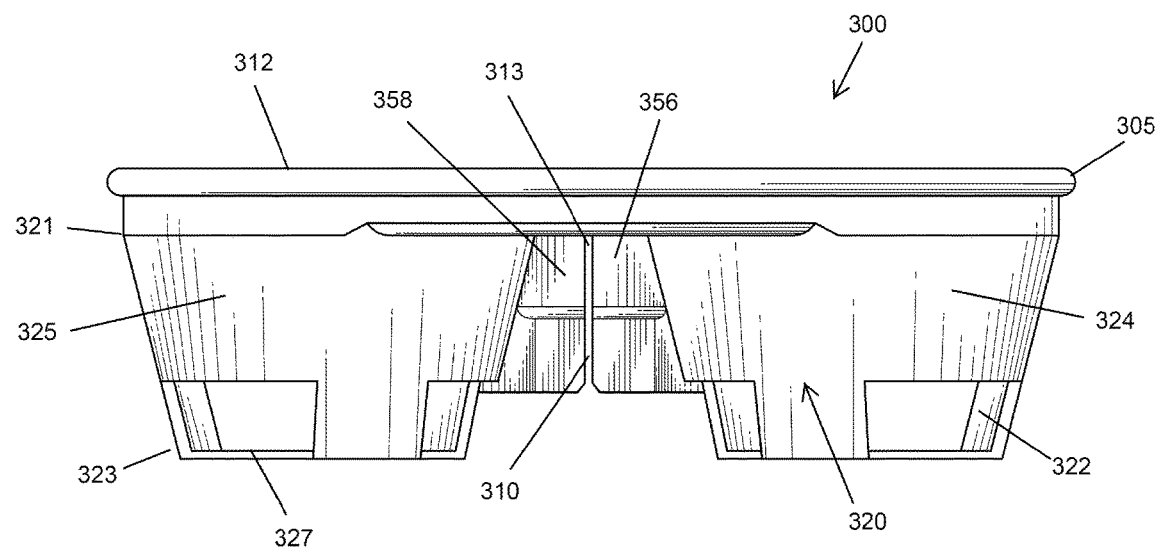
FIG. 14 is a front elevation view of the drink tray of FIG. 13.
Figure 15:
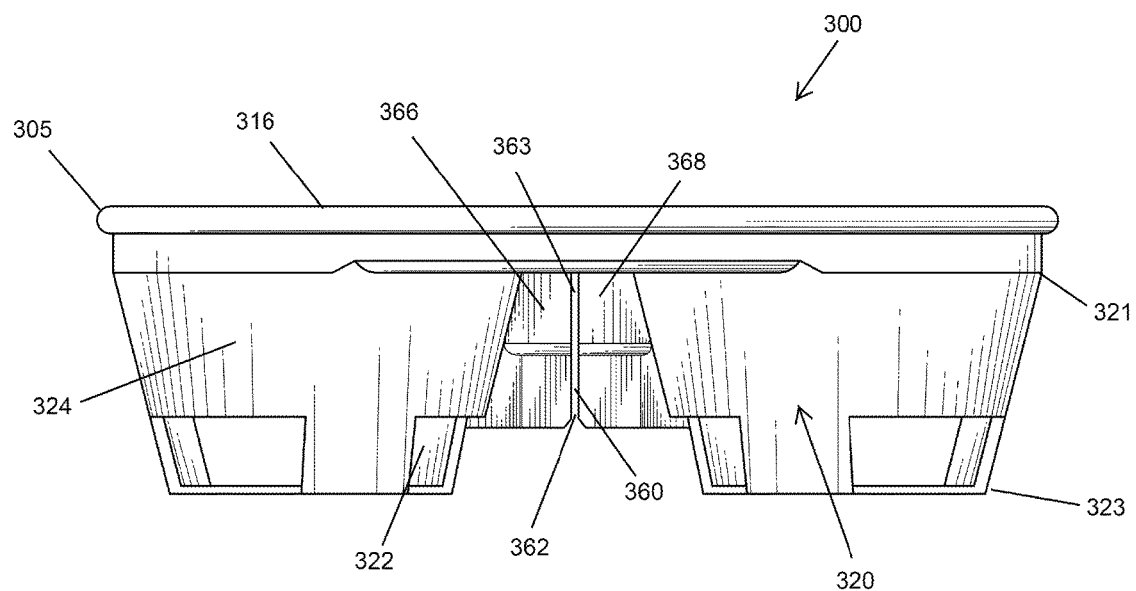
FIG. 15 is a right side elevation view of the drink tray of FIG. 13.
Figure 16:
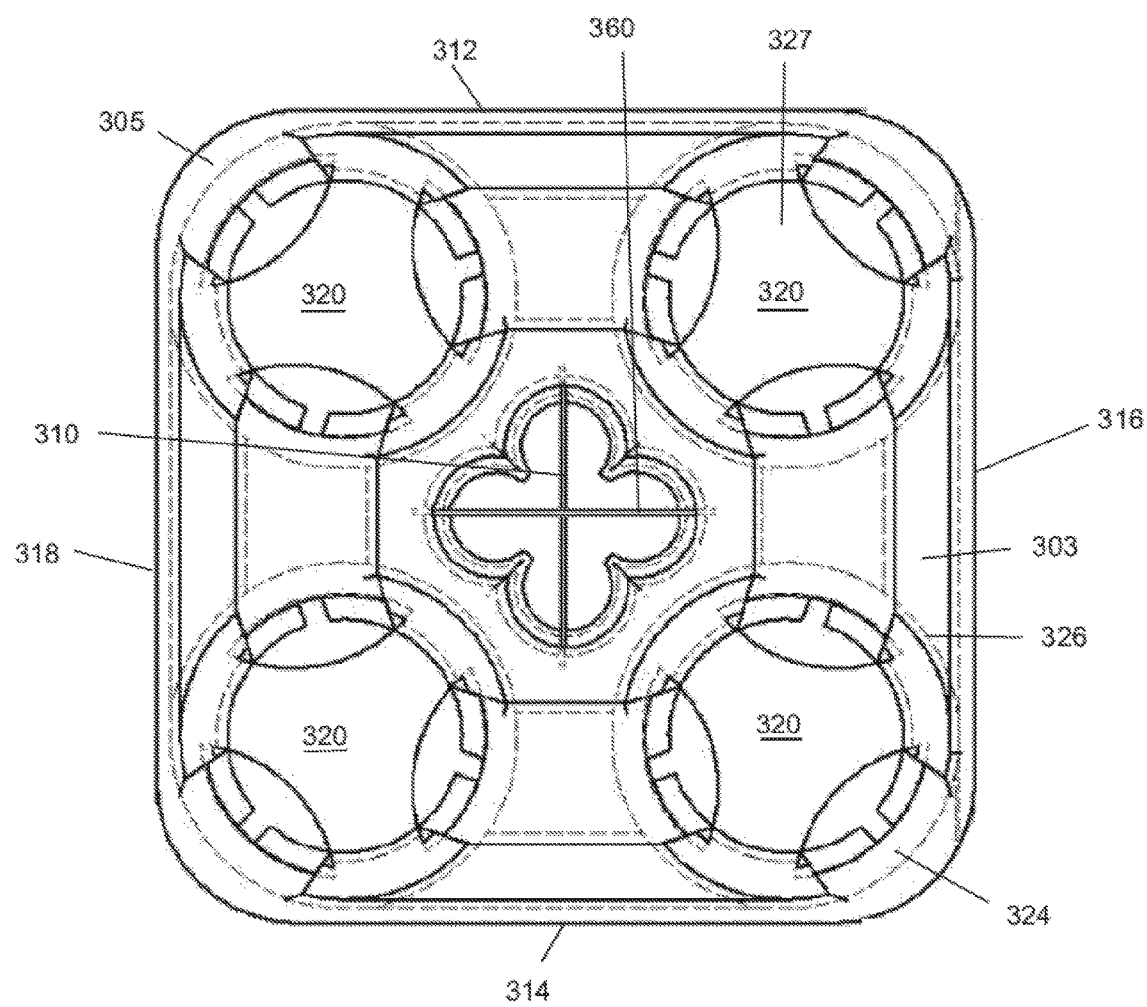
FIG. 16 is a bottom plan view of the drink tray of FIG. 13.

In this embodiment, the tray 300 further comprises a slot portion 350 comprising an upper end 351, a lower end 353, one or more walls 355 extending downwardly from the upper end to the lower end, a base 357 in the lower end, and a first slot 310, wherein the first slot comprises a horizontal longitudinal opening 311 in the base 357, the opening extending upwardly from the base 357 at a proximal longitudinal end 352 and at a distal longitudinal end 354 of the first slot 310 to form two upwardly extending openings 313 in the walls of the slot portion 350, wherein the slot bifurcates the base 357 into two lateral sides, right lateral side 356 and left lateral side 358, and is sized to allow a vehicle restraining belt to fit within the slot. The belt is fitted in use from a lower end 319 of the upwardly extending openings 313 to an upper end 317. The slot portion 350 is preferably in the center of tray, as shown in the illustrated embodiments, or alternatively can just be adjacent to the receptacles 320. Although the slot portion 350 can be solid in some embodiments, it preferably is formed in the manner of a receptacle, i.e. with a wall or walls 355 extending downwardly from the tray upper surface 351 and with a hollow center portion to reduce weight and material use as shown in FIGS. 9 and 13. In one embodiment, the hollow interior of the slot portion can comprise a receptacle for a container.

In an alternative embodiment, shown in FIGS. 13-16, a second slot 360 is provided in the drink tray 300. Like the first slot 310, the second slot 360 is sized to retain a seat belt and comprises a horizontal longitudinal opening 361 in the base 357, the opening extending upwardly from the base 357 at a right longitudinal end 362 and at a left longitudinal end 364 of the second slot 360 to form two upwardly extending openings 363 in the walls of the slot portion 350, wherein the second slot 360 bifurcates the base 357 into two lateral sides, and divides the slot portion 350 into a proximal side 366 and a distal side 368.

Figure 17:
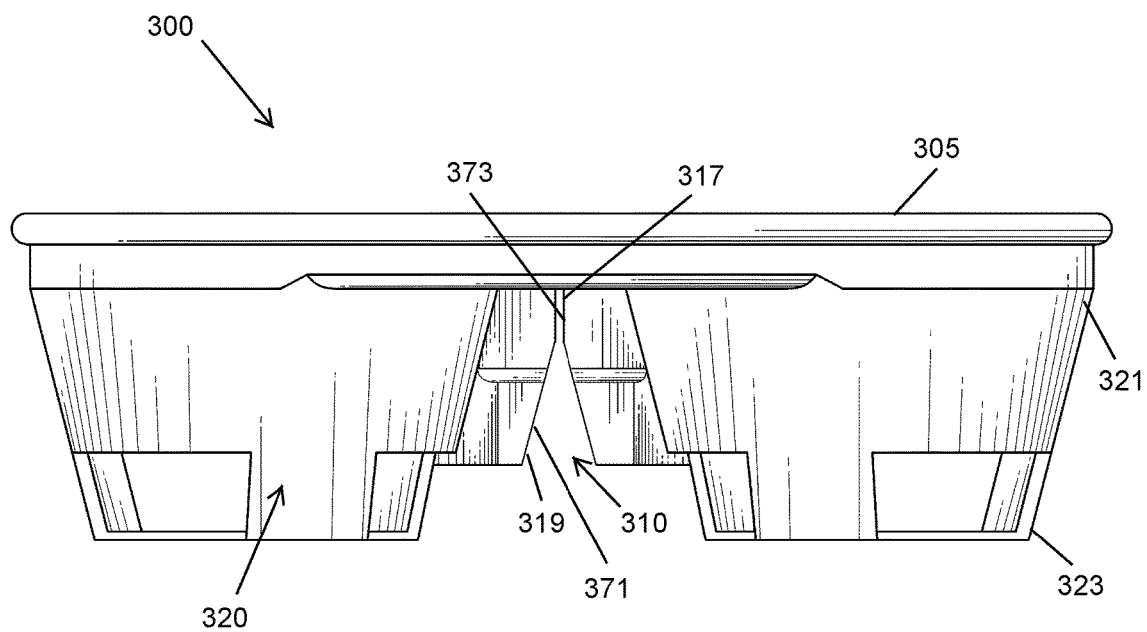
FIG. 17 is a side elevation view of an alternative embodiment of the present drink tray.

In a further alternative embodiment, shown in FIG. 17, the opening 311 in the center slot 310 can be formed with a lower end 319 which is wider than the upper end 317, in order to facilitate placement of a seat belt into the center slot 310. The opening 311 can have a shape (in cross-section) of an inverted "V," for example, or as shown in FIG. 17 the opening 311 can have the shape of the letter "Y" in cross-section. In FIG. 17, the lower end 319 comprises lower sloping walls 371, which extend inwardly from the lower end 319 toward the upper end 317. The sloping walls 371 connect at their upper end with parallel walls 373 which form a slit at the upper end 317 of the embodiment, shown in FIG. 17.

As shown in FIGS. 8-17, each of the slots 310 and 360 is preferably disposed parallel to at least one lateral side, and more preferably parallel to two opposing lateral sides, which are themselves approximately parallel. Slot 310 is thus shown as being approximately parallel to lateral sides 316 and 318, while slot 360 is shown as being approximately parallel to proximal side 312 and distal side 314. Preferably, the second slot 360 is disposed perpendicularly to the first slot 310. The second slot 360 is used with a seat belt in the same fashion as the first slot 310.

The slotted drink tray 300 can be formed from cellulosic materials such as pulp or cardboard, though polymer plastics and other materials can also be used to form the tray 300. In one embodiment, the trays are a press-formed or molded pulp trays. The slotted trays 300 are preferably square or rectangular in shape, with a proximal side 312, a distal side 314, a right lateral side 316, and left lateral side 318.

In use, the lower or lap portion 6 of a seat belt 8 in the depicted embodiment is passed between the center slot 310 and receptacles 320 extending downwardly from the underside of the tray 300. The rear surface of the tray 300 is thereby interposed or sandwiched between the back surface 8 of the seat 7 and the lap portion 6 of the seat belt 8. In this way, the horizontal motion (forward and backward) of the tray 300 is limited, with forward motion being restricted by contact between the inner opposing surface of the slot 310 (i.e., closer to the back surface 8) and the lap portion 6 of the seat belt 8, and backward motion being limited by contact between the outer surface of center slot 310 (i.e., further from the back surface 8) and the back surface 8 of the seat 7. In addition, when the lap belt 6 is disposed so as to hold the tray 300 under tension, the lap belt 6 pulls the proximal side of the tray 300 toward the back surface 8 of the seat 7 and also thereby preferably supports the proximal side above the upper surface 9 of the seat. The upper edge of the lap belt 6 may also assist in holding the proximal side above the upper surface 9 by contacting the upper terminus of the center slot 310.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure.

What is claimed is:

1. A vehicle tray for retaining containers, comprising:
   (a) a tray portion comprising an upper surface, a lower surface, a proximal side, a distal side, a right lateral side, a left lateral side, and two or more openings;
   (b) at least two receptacles, each receptacle being formed in an opening of the tray portion for retaining a container, wherein each receptacle comprises an interior surface, an exterior surface, an upper end, a lower end, one or more walls extending downwardly from the upper surface of the tray portion, and a floor formed in a lower end of the receptacle; and
   (c) a central slot portion in a center of the tray comprising an upper end, a lower end, one or more walls extending downwardly from the upper end to the lower end, a base in the lower end, and a first slot, wherein the first slot comprises a horizontal longitudinal opening in the base, the opening extending upwardly at each longitudinal end of the first slot to form two upwardly extending openings in the walls of the central slot portion, wherein the first slot is positioned between at least two receptacles and is parallel to a side of the tray portion, and wherein the slot bifurcates the base of the central slot portion into two lateral sides and is sized to allow a vehicle restraining belt to fit within the slot and between the at least two receptacles.

2. The vehicle tray of claim 1, wherein the tray portion is square.

3. The vehicle tray of claim 1, wherein the tray portion is rectangular.

4. The vehicle tray of claim 1, wherein the vehicle tray is formed from a polymer plastic material.

5. The vehicle tray of claim 1, wherein the opening in the slot portion has a lower end which is wider than the upper end of the opening.

6. The vehicle tray of claim 1, wherein the vehicle tray comprises two receptacles.

7. The vehicle tray of claim 1, wherein the vehicle tray comprises four receptacles.

8. The vehicle tray of claim 1, wherein the receptacles are integrally formed with the tray portion.

9. The vehicle tray of claim 1, wherein the interior surfaces of the walls of the receptacles are cylindrical or frusto-conical in shape.

10. The vehicle tray of claim 1, further comprising a second slot, the second slot comprising a horizontal longitudinal opening in the base that extends upwardly at each longitudinal end of the second slot to form upwardly extending openings in the walls of the slot portion.

11. The vehicle tray of claim 10, wherein the second slot is disposed perpendicularly to the first slot.

12. The vehicle tray of claim 1, wherein the upwardly extending openings in the walls of the central slot portion comprise sloping walls which extend inwardly from the lower end of the opening to the upper end of the opening.

\* \* \* \* \*